Sept. 6, 1927.
H. R. LLOYD ET AL
1,641,856
VIBRATION ABSORBER FOR AUTOMOBILES
Filed Aug. 31, 1926
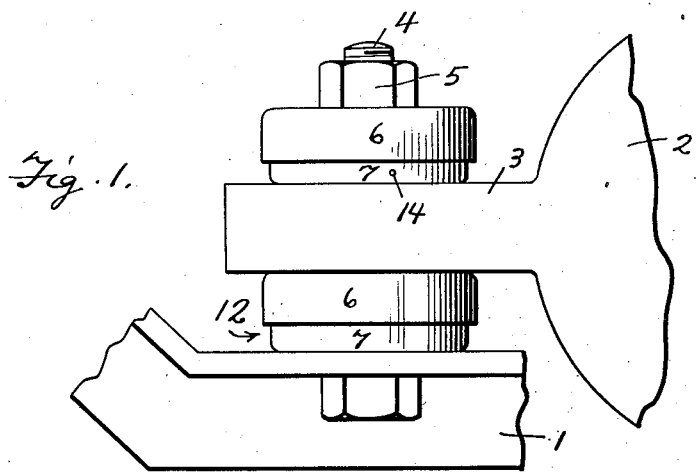
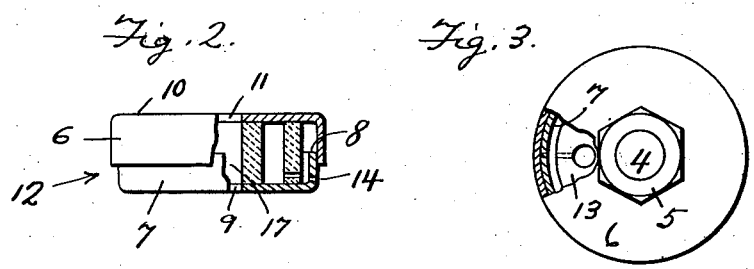
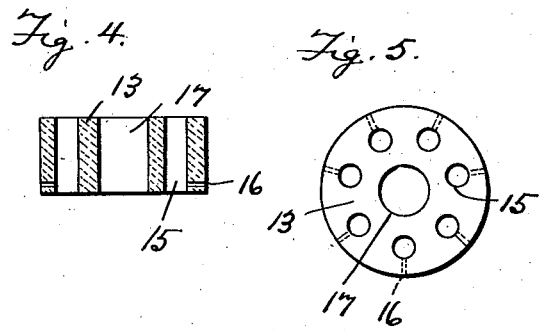
Herman R. Lloyd  Inventor
John W. Ellis
By Clarence A. O'Brien
Attorney Patented Sept. 6, 1927.

1,641,856

UNITED STATES PATENT OFFICE.

HERMAN R. LLOYD AND JOHN W. ELLIS, OF TAFT, CALIFORNIA.

VIBRATION ABSORBER FOR AUTOMOBILES.

Application filed August 31, 1926. Serial No. 132,838.

One object of our present invention is the provision of a device designed to absorb vibration and lessen noise incident to the operation of an automobile.

Another object of our invention is the provision of a friction vibration absorber designed to be used in conjunction with the hangers of an automobile engine with a view to permitting limited movement of the engine relative to the chassis and rendering it feasible to operate a light car at a high rate of speed with but little vibration and noise of the engine or the frame or chassis.

Other objects and practical advantages of the invention will be fully understood from the following description and claims when the same are read in connection with the drawings, accompanying and forming part of the specification, in which:—

Figure 1 is a fragmentary elevation illustrating the absorber constructed in accordance with our invention as arranged relative to a portion of an automobile frame and one arm of an automobile engine.

Figure 2 is a view partly in edge elevation and partly in section showing one of the cushions of our improvement.

Figure 3 is a view partly in plan and partly in section showing one of the cushions, the connecting bolt and the nut engaged with said bolt and superposed on said cushion.

Figure 4 is a diametrical section of the resilient element comprised in the cushion.

Figure 5 is a top plan view of said element.

Similar numerals of reference designate corresponding parts in all the views of the drawing.

We show in Figure 1 a portion 1 of an automobile frame, and we also show in said figure an automobile engine 2 having an arm 3, said arm being apertured in conventional manner.

In accordance with our invention a headed and threaded bolt is connected with and extended upwardly from the frame portion 1, said bolt being designated by 4 and being equipped with a nut or other appropriate retaining device 5.

Also in accordance with our invention one of our cushions is arranged below the arm 3 and the other cushion above said arm 3, the cushions being designated by 6. The said cushions are identical in construction, and therefore a detailed description of the cushion shown in Figures 2, 4 and 5 will suffice to impart a definite understanding of both. The cushion will be understood as made up of a lower casing section 7, flanged at 8 and having a center aperture 9 to receive the shank of the bolt 4, an upper casing section 10, apertured at 11 to receive the bolt shank and having a flange 12, and a resilient element 13, preferably of appropriate vulcanized rubber, arranged between the opposed walls of the casing sections 7 and 10, it being understood in this connection that the said sections 7 and 10 are preferably of appropriate metal, and that the section 10 telescopically receives the section 7. In its flange 8 the section 7 is provided with a minute aperture 14 for the passage of air. It will also be noted that the resilient element 13 is of such diameter that it is spaced inwardly from the flange 8 of the section 10, and that the said element 13 is provided with a circular series of vertically disposed apertures 15 and radial apertures 16, comparatively small in size and communicating with and extending outwardly from the apertures 15 to the perimeter of the element 13, and that the resilient element 13 is further characterized by a center aperture 17 for the reception of the shank of the bolt 4.

It will be apparent from the foregoing that the metallic sections 7 and 10 of each cushion are snugly fitted together and therefore they will serve efficiently in excluding dust and dirt from the interior of the cushions. It will also be apparent that the resilient element 13 will be protected by the metallic sections 7 and 10 and that the said resilient elements 13 will adequately support in yielding manner the upper sections 10 of the cushion.

In the practical operation of our improvement, it will be manifest that the arm 3 of the motor 2 is adapted to work between the shock absorbers or cushions above and below the said arm 3. The casing sections 7 and 10 close both ends of the apertures 15 in the resilient element 13, and when the sections 7 and 10 are pressed together, the minute apertures or ports 14 in the flanges 8 of the casing sections 7 are closed as are also the outer end of the minute apertures 16. By virtue of this, a pneumatic cushioning effect of high efficiency is produced. It will also be noted in this connection that as the cushions or absorbers are relieved of pressure, air will be permitted to pass inwardly through the minute port 14 of each cushion section 7 and also through the minute ports 16 of the resilient elements 13 and into the apertures 15 of the said resilient elements.

In addition to the practical advantages ascribed to our improvement, it will be appreciated that the improvement is compact in construction and strong and durable and therefore well adapted to withstand the usage to which automobile appurtenances are ordinarily subjected.

It will also be appreciated that our improvement is susceptible of being quickly and easily installed.

We have entered into a detailed description of the construction and relative arrangement of parts comprised in the present and preferred embodiment of our invention in order to impart a full, clear and exact understanding of the said embodiment. We do not desire, however, to be understood as limiting ourselves to the precise construction illustrated and described, our invention being defined by our appended claims within the scope of which structural changes may be made without departure from our invention.

Having thus described the invention, what we claim is:—

1. In combination, a support, an apertured part to be supported, a bolt carried by and extending upwardly from said support and through said apertured part, an abutment on the upper portion of said bolt, and shock absorbers surrounding the bolt and arranged between the support and the apertured part and between the apertured part and the abutment, respectively; each of the said shock absorbers comprising telescopically arranged casing sections with an air aperture in one section and adapted to be controlled by the other section, and a resilient section arranged in and housed by the casing sections and interposed between opposed portions thereof, and having a center aperture to receive the bolt and also having a circular series of upright apertures about the central aperture, and minute apertures extending outwardly from the apertures in the circular series.

2. A shock absorber comprising flanged telescopically arranged casing sections, one of which is provided with an air aperture in its flange arranged to be controlled by the flange of the other casing section, and a resilient element housed in the casing section and interposed between opposed portions thereof and having air containing means and minute means connecting said air containing means and a space between the resilient element and the innermost casing section.

3. A shock absorber or cushioning device comprising flanged telescopically arranged casing sections, one of which is provided with an air aperture in its flange arranged to be controlled by the flange of the other casing section, and a resilient element housed in the casing section and interposed between opposed portions thereof and having air containing means and minute means connecting said air containing means and a space between the resilient element and the innermost casing section; the said casing sections having coincident bolt receiving apertures, and the said resilient element having a central bolt receiving aperture and being of a less diameter than the innermost casing section and separated by an annular intervening space from the flange of said section.

In testimony whereof we affix our signatures.

HERMAN R. LLOYD.
JOHN W. ELLIS.